US010984279B2

(12) United States Patent
Ramachandra Iyer

(10) Patent No.: US 10,984,279 B2
(45) Date of Patent: Apr. 20, 2021

(54) SYSTEM AND METHOD FOR MACHINE TRANSLATION OF TEXT

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 73 days.

(21) Appl. No.: 16/542,392

(22) Filed: Aug. 16, 2019

(65) Prior Publication Data
US 2020/0394431 A1 Dec. 17, 2020

(30) Foreign Application Priority Data

Jun. 13, 2019 (IN) .............................. 201941023491

(51) Int. Cl.
*G06K 9/46* (2006.01)
*G06N 3/08* (2006.01)
(Continued)

(52) U.S. Cl.
CPC ............... *G06K 9/46* (2013.01); *G06F 40/58* (2020.01); *G06K 9/6262* (2013.01); *G06N 3/08* (2013.01); *G06K 2209/01* (2013.01)

(58) Field of Classification Search
CPC ........ G06K 9/46; G06K 9/6262; G06K 9/344; G06K 9/723; G06K 9/00442;
(Continued)

(56) References Cited
U.S. PATENT DOCUMENTS

| 5,438,630 | A | 8/1995 | Chen et al. | |
| 7,236,632 | B2 * | 6/2007 | Erol | G06K 9/00442 382/218 |

(Continued)

FOREIGN PATENT DOCUMENTS

CN 1979529 A 6/2007

OTHER PUBLICATIONS

"Improved optical character recognition with deep neural network"; Tan Chiang Wei, 2018 IEEE 14th International Colloquium on Signal Processing & Its Applications (CSPA) (pp. 245-249) (Year: 2018).*

(Continued)

*Primary Examiner* — Michael S Osinski
(74) *Attorney, Agent, or Firm* — Finnegan, Henderson, Farabow, Garrett & Dunner, LLP

(57) ABSTRACT

A method and system for machine translation of text is disclosed. The method includes processing an image comprising a text to generate a pattern associated with the text based on a trained Convolution Neural Network (CNN). The method further includes mapping the pattern to a word in a mapping table and at least one text attribute, based on a classifier network. The method further includes initiating an Optical Character Recognition (OCR) conversion for the pattern, when at least one of the mapping between at least one of the pattern and at least one word in the mapping table and the mapping between the pattern and the at least one text attribute is below a predefined threshold. The method further includes performing incremental learning for the trained CNN and the classifier network based on the OCR conversion.

19 Claims, 6 Drawing Sheets

(51) Int. Cl.
*G06K 9/62* (2006.01)
*G06F 40/58* (2020.01)

(58) Field of Classification Search
CPC ...... G06K 9/00456; G06K 9/18; G06K 9/325;
G06K 9/3258; G06K 9/4671; G06K
9/4676; G06K 2209/01; G06K 2209/15;
G06F 40/58; G06F 16/24568; G06F
16/60; G06F 16/313; G06F 16/51; G06F
16/5838; G06F 16/86; G06F 16/90344;
G06N 3/08; G06N 3/0445; G06N 3/0454
See application file for complete search history.

(56) References Cited

U.S. PATENT DOCUMENTS

| | | | | |
|---|---|---|---|---|
| 7,305,382 | B2* | 12/2007 | Kobayashi | G06F 16/313 |
| | | | | 707/709 |
| 8,014,604 | B2 | 9/2011 | Tzadok et al. | |
| 8,224,092 | B2* | 7/2012 | Bressan | G06K 9/00859 |
| | | | | 382/177 |
| 8,452,099 | B2* | 5/2013 | Reddy | G06K 9/6255 |
| | | | | 382/187 |
| 8,494,273 | B2* | 7/2013 | Chevion | G06K 9/6255 |
| | | | | 382/182 |
| 8,731,300 | B2* | 5/2014 | Rodriguez Serrano | |
| | | | | G06K 9/6297 |
| | | | | 382/186 |
| 9,361,515 | B2* | 6/2016 | Gross | G06K 9/723 |
| 9,430,704 | B2* | 8/2016 | Abdollahian | G06K 9/18 |
| 9,432,671 | B2* | 8/2016 | Campanelli | G06K 9/00456 |
| 9,575,952 | B2* | 2/2017 | Kumar Rangarajan Sridhar | |
| | | | | G06F 40/30 |
| 9,760,797 | B2* | 9/2017 | Feng | G06T 7/13 |
| 10,339,141 | B2* | 7/2019 | Cafarella | G06F 16/24568 |
| 10,747,962 | B1* | 8/2020 | Fuerstenau | G06F 40/51 |
| 2002/0041713 | A1* | 4/2002 | Imagawa | G06K 9/723 |
| | | | | 382/229 |
| 2006/0123000 | A1* | 6/2006 | Baxter | G06F 16/86 |
| 2007/0005356 | A1* | 1/2007 | Perronnin | G06K 9/4676 |
| | | | | 704/245 |
| 2007/0258648 | A1* | 11/2007 | Perronnin | G06K 9/726 |
| | | | | 382/224 |
| 2008/0069456 | A1* | 3/2008 | Perronnin | G06K 9/4671 |
| | | | | 382/228 |
| 2010/0008581 | A1 | 1/2010 | Bressan | |
| 2011/0301935 | A1* | 12/2011 | Quirk | G06F 40/295 |
| | | | | 704/2 |
| 2013/0301920 | A1* | 11/2013 | Venkatapathy | G06K 9/72 |
| | | | | 382/182 |
| 2016/0027433 | A1* | 1/2016 | Itoh | G10L 15/197 |
| | | | | 704/9 |
| 2018/0137353 | A1* | 5/2018 | Nagao | G06K 9/481 |
| 2019/0205752 | A1* | 7/2019 | Pelletier | G06N 3/08 |
| 2019/0385001 | A1* | 12/2019 | Stark | G06K 9/344 |
| 2020/0026951 | A1* | 1/2020 | Chowdhury | G06K 9/6256 |
| 2020/0097750 | A1* | 3/2020 | Tanaka | G06K 9/4604 |
| 2020/0143201 | A1* | 5/2020 | Chen | G06N 3/08 |
| 2020/0202159 | A1* | 6/2020 | Zhou | G06F 40/166 |
| 2020/0279107 | A1* | 9/2020 | Staar | G06K 9/00442 |
| 2020/0311460 | A1* | 10/2020 | Zheng | G06K 9/46 |

OTHER PUBLICATIONS

"Optical character recognition using back propagation neural network"; Shyla Afroge, 2016 2nd International Conference on Electrical, Computer & Telecommunication Engineering (ICECTE) (pp. 1-4) (Year: 2016).*

* cited by examiner

SYSTEM AND METHOD FOR MACHINE TRANSLATION OF TEXT

TECHNICAL FIELD

This disclosure relates generally to translation of text, and more particularly to a method and system for machine translation of text using Convolution Neural Network (CNN).

BACKGROUND

Digitization or translation of a scanned document or an image, which includes text or hand-written papers, into machine readable text is increasingly being used in several applications. For translation of the scanned document that includes characters, conventional algorithms for optical character recognition (OCR) perform efficiently. However, efficiency in performance for the conventional algorithms is limited to character recognition, as in order to process and translate large and text rich documents, the conventional algorithms take a lot of time. Moreover, the OCR often fails to accurately identify punctuations and digits, without requiring manual intervention or supervision. Additionally, the capabilities of the OCR mechanism may be restricted to a specific font, thereby further limiting robustness of a system implementing the OCR mechanism.

Some conventional methods convert word images to words that are specific to a document. In such methods, image of a word is stored, and when same word image appears, the image is decoded in same way. Moreover, other conventional methods use word spotting in bitmap images based on word bounding boxes.

However, the conventional methods have the following drawbacks. The digitization of documents happens at character level, as a result, recognition happens one by one in a word leading to issues including requirement of significant time, lack of a method to support translation of hand written words in one language to hand written words in other languages, absence of a method to check if the system can support a specific font text or not.

SUMMARY

In one embodiment, a method of machine translation of text is disclosed. The method may include processing an image that includes a text to generate a pattern associated with the text based on a trained Convolution Neural Network (CNN). The method may further include mapping the pattern to a word in a mapping table and at least one text attribute, based on a classifier network. The text may be in a source language and the word may be in a target language. The method may further include initiating an Optical Character Recognition (OCR) conversion for the pattern, when at least one of the mapping between at least one of the pattern and at least one word in the mapping table and the mapping between the pattern and the at least one text attribute is below a predefined threshold. The method may further include performing incremental learning for the trained CNN and the classifier network based on the OCR conversion.

In another embodiment, a translation device for machine translation of text is disclosed. The translation device includes a processor and a memory communicatively coupled to the processor, where the memory stores processor instructions, which, on execution, causes the processor to process an image comprising a text to generate a pattern associated with the text based on a trained CNN. The processor instructions further cause the processor to map the pattern to a word in a mapping table and at least one text attribute, based on a classifier network. It should be noted that the text may be in a source language and the word may be in a target language. The processor instructions further cause the processor to initiate an OCR conversion for the pattern, when at least one of the mapping between at least one of the pattern and at least one word in the mapping table and the mapping between the pattern and the at least one text attribute is below a predefined threshold. The processor instructions further cause the processor to perform incremental learning for the trained CNN and the classifier network based on the OCR conversion.

In yet another embodiment, a non-transitory computer-readable storage medium is disclosed. The non-transitory computer-readable storage medium has instructions stored thereon, a set of computer-executable instructions causing a computer comprising one or more processors to perform steps of processing an image comprising a text to generate a pattern associated with the text based on a trained CNN; mapping the pattern to a word in a mapping table and at least one text attribute, based on a classifier network; initiating an OCR conversion for the pattern, when at least one of the mapping between at least one of the pattern and at least one word in the mapping table and the mapping between the pattern and the at least one text attribute is below a predefined threshold; and performing incremental learning for the trained CNN and the classifier network based on the OCR conversion. It should be noted that the text may be in a source language and the word may be in a target language.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
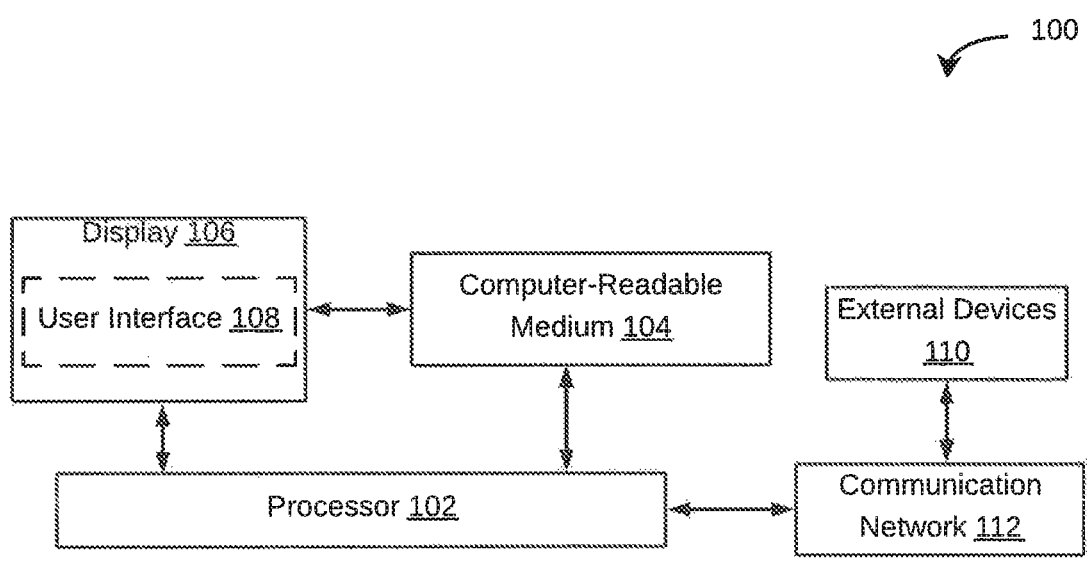
FIG. 1 is a block diagram of a system for machine translation of text, in accordance with an embodiment.

Referring now to FIG. 1, a block diagram of a system 100 for machine translation of text is illustrated, in accordance with an embodiment. As will be appreciated, the system 100 may be implemented in a translation device (not shown in FIG. 1). The translation device may be further embedded in a server, a desktop, a laptop, a notebook, a netbook, a tablet, a smartphone, a mobile phone, or any other computing device.

As will be described in greater detail in conjunction with FIGS. 2-6, the translation device may process an image that includes a text to generate a pattern associated with the text based on a trained Convolution Neural Network (CNN). Further, the translation device may map the pattern to a word in a mapping table and one or more text attributes, based on a classifier network. The text may be in a source language and the word may be in a target language. When either the mapping between one or more of the pattern and one or more words in the mapping table or the mapping between the pattern and the one or more text attributes is below a predefined threshold, the translation device may initiate an Optical Character Recognition (OCR) conversion for the pattern. Based on the OCR conversion, the translation device may perform incremental learning for the trained CNN and the classifier network.

The system 100 may include a processor 102, a computer-readable storage medium 104 (for example, a memory), and a display 106. The computer-readable storage medium 104 may store instructions that, when executed by the processor 102, may cause the processor 102 to perform machine translation of text. The computer-readable storage medium 104 may also store various data (for example, pattern, image, text, mapping table, text attributes, predefined threshold, and the like) that may be captured, processed, and/or required by the system 100. The system 100 may interact with a user via a user interface 108 accessible via the display 106. The system 100 may also interact with one or more of external devices 110 over a communication network 112 for sending or receiving various data. The external devices 110 may include, but may not be limited to a remote server, a digital device, or another computing system. The system 100 may also be adapted to exchange data with other components or service providers using the communication network 112, for example, Wide Area Network (WAN) or the Internet.

Figure 2:
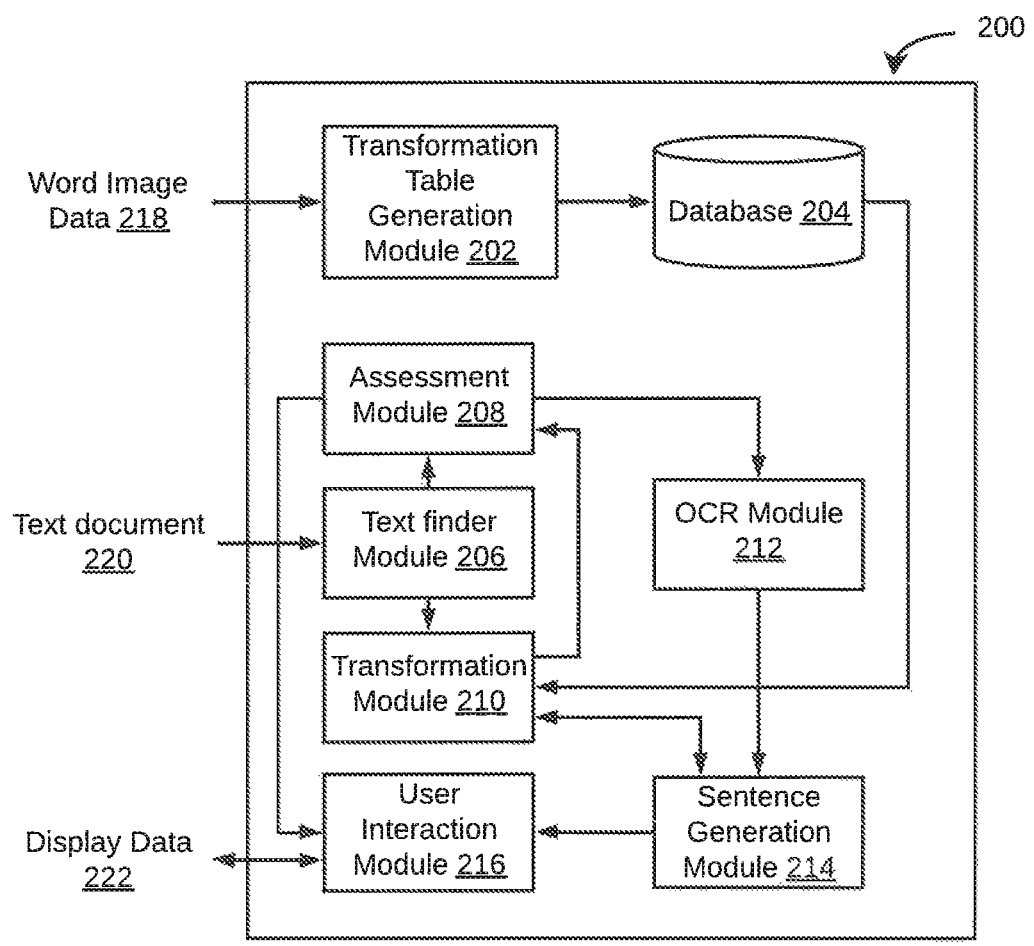
FIG. 2 illustrates a functional block diagram of a translation device for machine translation of text, in accordance with an embodiment.

Referring now to FIG. 2, a functional block diagram of a translation device 200 configured to perform machine translation of text is illustrated, in accordance with an embodiment. The translation device 200 may implement the system 100. The translation device 200 may include a transformation table generation module 202, a database 204, a text finder module 206, an assessment module 208, a transformation module 210, an OCR module 212, a sentence generation module 214, and a user interaction module 216. As will be appreciated by those skilled in the art, all such aforementioned modules 202-216 may be represented as a single module or a combination of different modules. Moreover, as will be appreciated by those skilled in the art, each of the modules 202-216 may reside, in whole or in parts, on one device or multiple devices in communication with each other.

The transformation table generation module 202 may receive word image data 218, which may be used as a training data by a CNN in the transformation table generation module 202. The word image data 218 may include one or more of the training dataset of each class of 'WordNet' and a vocabulary set which may include image of a plurality of words and the corresponding machine-readable words.

After receiving the word image data 218, the transformation table generation module 202 may generate a mapping table that may include images for each word present in the word image data 218. The transformation table generation module 202 may then store the mapping table in the database 204, which may then be used by the transformation module 210 for machine translation of text. In an embodiment, the mapping table may be generated offline. The database 204 may be used to store an intermediate result, the mapping table, or the like. The database 204 may need to work fast within the translation device 200, as text documents may be required to be converted to machine readable text in real time.

After the mapping table has been stored in the database 204, the text finder module 206 may receive a text document 220. The text document 220 may be an input document that includes text that is required to be translated into machine readable form. The text document 220, for example, may include full text, scanned copies of receipts, or the like, where text forms a substantial part of the text document 220.

The assessment module 208 may be used to assess whether the translation device 200 is capable of determining or identifying the font used within the text document 220 received by the text finder module 206, in order to transform the font into machine readable form. The assessment module 208 may also determine whether the translation device 200 is capable of identifying other attributes associated with text used within the text document 220. Examples of the other attributes may include, but are not limited to style or color associated with the text. The style may include the text being in bold, in italics, strikethrough, or underlined. The assessment module 208 may make the assessment based on the capability of the translation device 200 to generate the correct output. The assessment module 208 may evaluate the capability of the translation device 200 to generate the correct output by comparing the output of the translation device 200 with an output received from the OCR module 212, which is configured to produce the output character by character. When the output of the translation device 200 may not match with the output of the OCR module 212, then the output received from the OCR module 212 may be used to train the translation device 200. As a result, the translation device 200 may learn a new font or any other attribute associated with text. Based on this, incremental learning of the translation device 200 is performed.

Once the assessment module 208 has determined the current capability of the translation device 200, the text finder module 206 may determine boundaries for each word in the text document 220. The text finder module 206 may then generate word images for each such boundary. As a result, the text finder module 206 separates the words within the text document 220. The text finder module 206 may then provide the word images thus generated along with respective coordinates to each of the transformation module 210 and the assessment module 208.

The transformation module 210 may be configured to convert or transform each word image into machine readable words. Hence, the transformation module 210 may generate the output as machine readable words associated with the word images. The transformation module 210 may then send the machine readable words to the sentence generation module 214, which may contextually brace the machine readable words to form a sentence including punctuations. When the transformation module 210 is not able to perform the transformation, the OCR module 212 may transform the word image into the machine readable character. The OCR module 212 may generate the output as a collection of characters, as text of the word image may need to be split into character in order to get recognized. The OCR module 212 may get triggered when the assessment module 208 may assess that the translation device 200 may not be capable to handle the font or other attributes for the text in the text document 220. Further, the OCR module 212 may send the output as a collection of characters to the sentence generation module 214.

The sentence generation module 214 may generate the sentence using the machine readable words received from either the transformation module 210 or the OCR module 212. The sentence generation module 214 may ensure contextual flow of words to sentence and characters to words. The sentence generation module 214 may be trained to introduce punctuation, word spacing, or the like.

The user interaction module 216 may facilitate interaction of a user with the translation device 200, such that, the user interaction module 216 may collect and display a response to the user, i.e., a display data 222, which is an output provided to the user by the translation device 200. The display data 222 may include the machine readable text and information associated with the capability of the translation device 200 to transform a specific font or other attributes associated with the text document 220. The user interaction module 216 may receive the machine readable text from the sentence generating module 214 and the information regarding the capability of the translation device 200 from the assessment module 208.

The modules in the functional block diagram of the translation device 200 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, SPI, Microwire, 1-Wire, IEEE 1284, Intel Quick Path Interconnect, InfiniBand, PCIe etc.

Figure 3A:
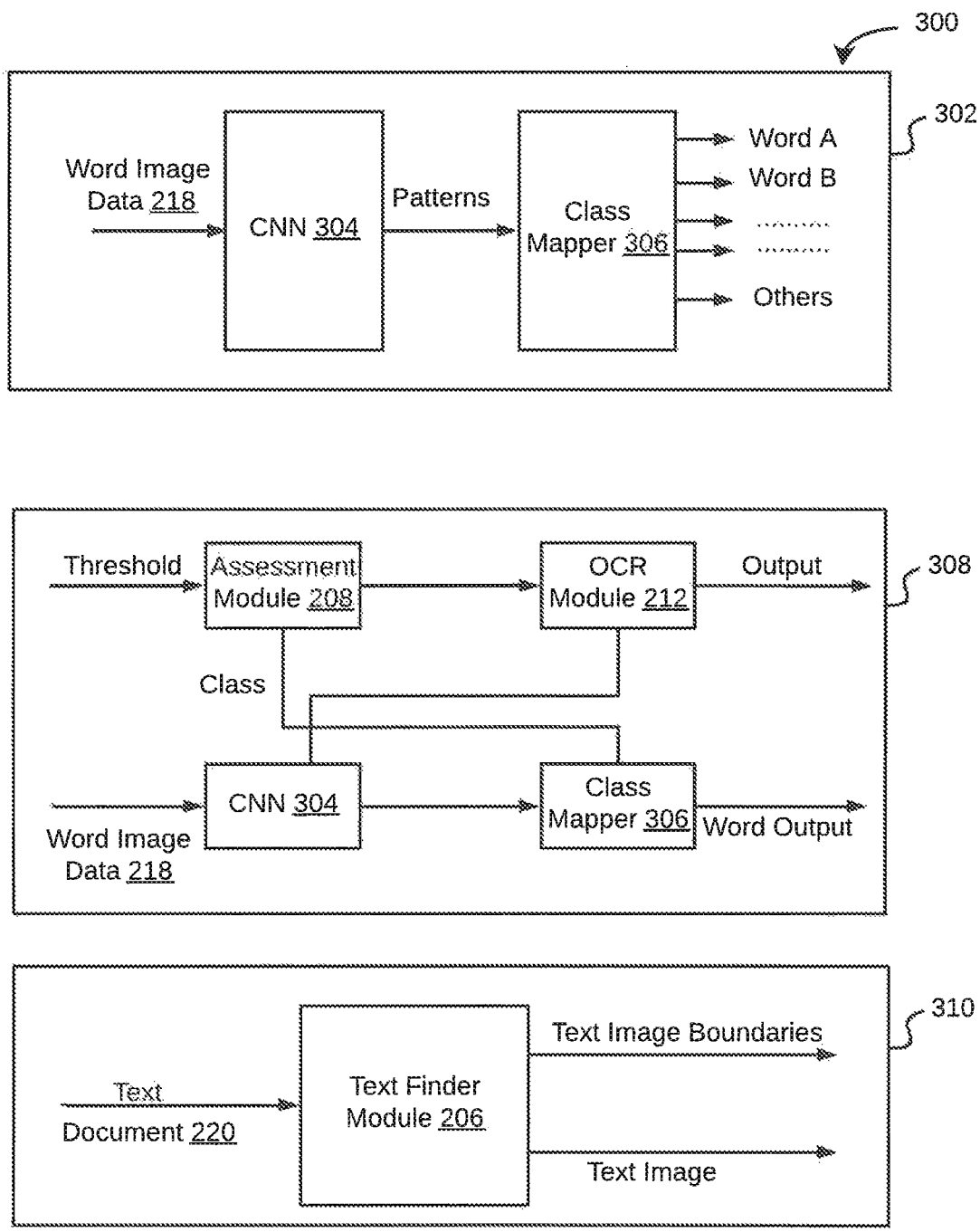
FIGS. 3A and 3B illustrate a flowchart of a method for machine translation of text, in accordance with an embodiment.
Figure 3B:
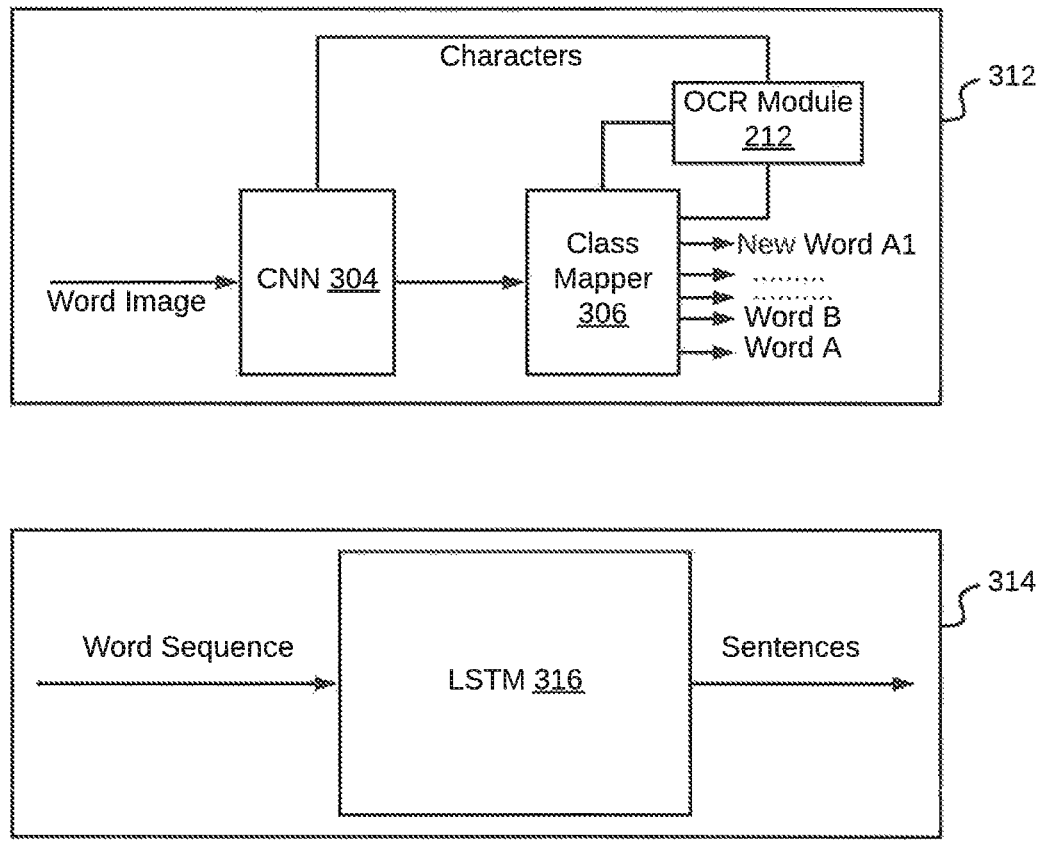

Referring now to FIGS. 3A and 3B, a flow diagram 300 depicting machine translation of text through various modules of the translation device 200 is illustrated, in accordance with an embodiment. At 302, the transformation table generation module 202 may train a CNN 304 to generate features for the word image data 218 and patterns associated with the features of the word image data 218. To this end, the transformation table generation module 202 may use words in the WordNet or a limited vocabulary typically used in the domain and may map these words to corresponding images. In an embodiment, a single font (for example, times new roman) may be supported. In another embodiment, the layers of CNN may be increased to support multiple fonts. A class mapper 306 may then map the patterns to the words stored in a network (for example, Word A, Word B, Word C, or the like). The class mapper 306, for example, may be a Support Vector Machine (SVM) classifier or a Multi-Layer Perceptron (MLP). Thus, the combination of the CNN 304 and the class mapper 306 may take the image of a word in the vocabulary as input and may map the same to a class of English word that is stored in the mapping table. Additionally, mapping of an image of a word, the corresponding pattern, and the corresponding class may be stored in the mapping table, at 302. In an embodiment, the class mapper 306 may also include an additional class, for example, an unknown class, for an input word image that does not map to any of the classes in the mapping table.

At 308, the probability of mapping an input word image with the unknown class, may be compared with a threshold by the assessment module 208. When the mapping with the unknown class is higher than a threshold (for example, a match score of 0.4), the translation device 200 may invoke identification of word from the input word image using the OCR module 212.

Additionally, at 308, the text document 220 may be received by the translation device 200. The text document 220 may include a plain text in a font (for example, times new roman) that is readily supported by the translation device 200. The assessment module 208 may determine that the translation device 200 does not support detection of the font in the text document 220. In this case, the assessment module 208 may prompt the translation device 200 to alert the user and to switch over to character based recognition using the OCR module 212, which may be slow. The OCR module 212 may then provide an output to the user. This has already been explained in detail in conjunction with FIG. 2.

Thus, a self-assessment of the translation device 200, for its capability to understand a given font, may be accomplish in the assessment module 208. To this end, the assessment module 208 may be provided with a class and the threshold associate with the class, the assessment module 208 decides whether the OCR module 212 should be activated or not. In an embodiment, for a given class, a pattern generated from text in the text document 220 is mapped to a word in the mapping table and one or more text attributes, based on the CNN. When either the mapping between the pattern and at least one word in the mapping table or the mapping between the pattern and the one or more text attributes is below a predefined threshold, the assessment module 208 may activate the OCR module 212 to perform OCR conversion for the pattern to generate an output. Based on the output, the translation device 200 performs incremental learning for the CNN 304 and the class mapper 306.

In an embodiment, when the text document 220 is received, the OCR module 212 may be invoked initially for a fixed number of words. When the translation of the word image to a word through the transformation module 210 may match with the output generated by the OCR module 212 in most of the cases, then the assessment module 208 may indicate that the translation device 200 may be capable to understand the font of the text and thus the OCR module 212 may be deactivated Referring back to 308, when either the mapping between the pattern and at least one word in the mapping table and/or the mapping between the pattern and the one or more text attributes is above the predefined threshold, at 310, the text finder module 206 may extract the word image from the scanned copy of the text document 220, which is required to be converted to a machine readable text. Words may be separated by a space, and this aspect may be used by the text finder module 206 to extract a rectangle that includes the word in its entirety, as the image of interest. Thus, the text finder module 206 may receive the text document 220 as the input and may provide the extracted word as the text image along with the coordinates of the rectangle around the text image.

At 312, the word image selected from the page in the document is transformed in to machine readable text. It is implemented in the transformation module 210 and the OCR module 212. Image patterns and associated descriptive text are generated as detailed in 302. In other words, the class mapping for a given word image is performed. In an embodiment, the output of the class mapper 306 may be a hand-written image of the word being classified. The word images are positioned next to each other with same font size as derived at step 310.

Additionally, at 312, the translation device 200 may be trained based on the output of the transformation module 210 and the OCR module 212. Once the OCR module 212 may get triggered, the translation device 200 may start training itself using the pattern of the text (with new font) which may be the output of the OCR module 212. The class mapper 306 may be incrementally trained to accommodate new font words (for example, new word A1). Additionally, a new class may be added to accommodate the new font words. Once an equivalent vocabulary in the new font word may be built, the translation device 200 may be ready to support the font without using the OCR module 212 in future. In one embodiment, the font of the word may be user's handwriting. Hence, when the vocabulary may be domain specific and limited, then the translation device 200 may quickly learn user's handwriting and its inherent variations using the OCR module 212.

At 314, the sentence generation module 214 may pass the word sequence (output of the class mapper 306) to a Long Short Term Memory (LSTM) 316 to generate a sentence. Errors of decoding may be corrected based on the appropriateness of the word in the sentence. Moreover, these word sequences may be compared with the transformation word sequence. If there is any discrepancy, it may be alerted to the user.

By way of an example of the above described flow diagram 300, a word 'This' may be written in the user's handwriting which may be required to be translated to the Hindi language. In the offline process of the translation device 200, the penultimate layer output patterns of the CNN 304, which represent the signature of the images may be generated and corresponding word dictionary (vocabulary) may be built using the class mapper 306 (which, for example, may be LSTM). The image signatures or patterns may be stored along with the output of the class mapper 306.

Further, the translation device 200 may also store the user hand written image of the equivalent word in another language. When the word may not be available, the translation device 200 may synthesize from character combinations of the word that the user may have already provided (for example—for English, the user may have provided 26 characters, 10 digits, and special characters). For example, the pattern may be [103.4 35 56.8 . . . ]. In one implementation, the penultimate layer may contain 8192 values representing the pattern, which may be too large. Hence, 30 most relevant values may be stored as the pattern in the database 204. The relevant values may be obtained using an algorithms (for example, a Layer wise relevance propagation algorithm).

Further, the translation device 200 may check whether it may read and decode the word 'this'. If not, the translation device 200 may switch over to conventional OCR technique. If the translation device 200 can, then the word 'This' may be extracted from a long chain of texts including many words. The boundary coordinates may be generated and the word may be extracted. When the text 'This' may be applied to the CNN 304, nearly the same pattern may be generated. This is compared with all patterns in the dictionary. The matching word "This" is extracted. The class mapper 306 may also confirms the same.

Moreover, when language translation may be required then the sentence of other language (for example, Hindi) may be formed first with the decoded words. The other language words may also be sequenced to get the translated document. Alternatively, the word fonts may be selected from the mapping table and placed next to each other in order to give handwritten document in other language.

In a scenario, when there is no entry for the word "That" written by user, the translation device 200 may trigger the OCR module 212 and decodes the image of the word "That" character by character. Additionally, the translation device 200 may generates pattern of the image and stores the decoded patterns as well as the output of the class mapper 306. Hence, the translation device 200 may learn new words and adds to the vocabulary. When a series of words may be required to be decoded one by one, then the translation device 200 may feed the series of words to the LSTM 316 to form a correct sequence of sentence including a possible spellcheck. Further, the translated document may be rendered to user who may fine tune the document. These changes may be directly added to vocabulary or the mapping table and may also be used to retrain the CNN 304 and the class mapper 306 incrementally.

Figure 4:
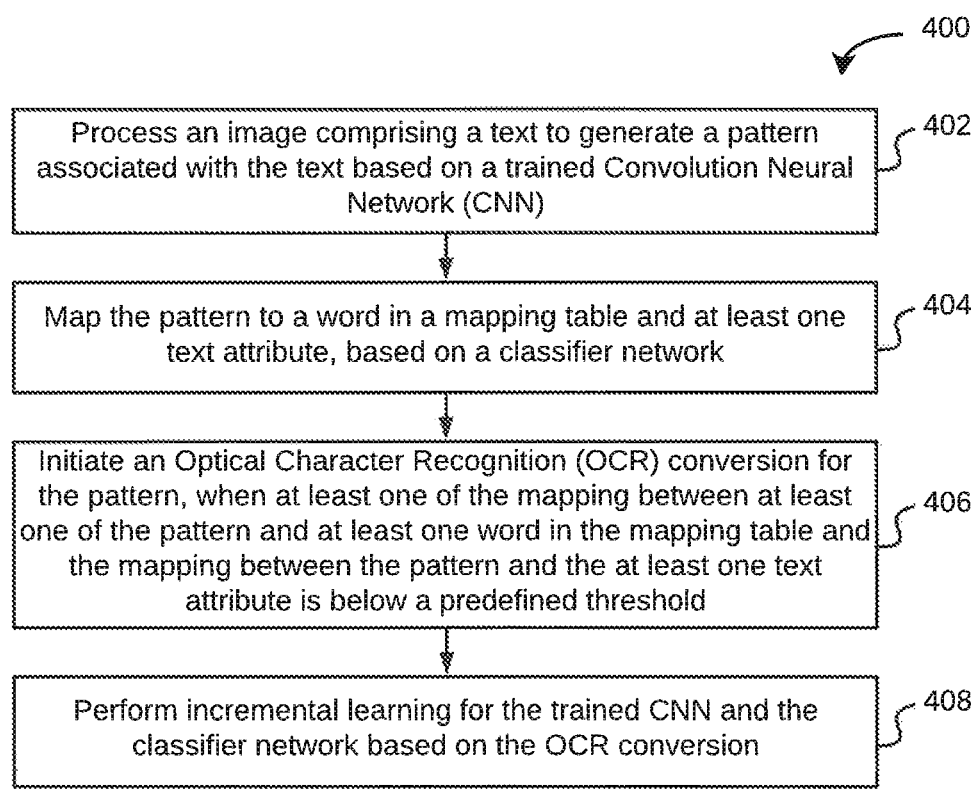
FIG. 4 illustrates an exemplary method for machine translation of text, in accordance with an embodiment.

Referring now to FIG. 4, an exemplary method 400 for machine translation of text is illustrated, in accordance with an embodiment. At step 402, the translation device 200 may process an image that includes a text, to generate a pattern associated with the text based on a trained CNN, (for example, the CNN 304). This has already been explained in detail in conjunction with FIG. 2 and FIGS. 3A. and 3B

The translation device 200 may also identify the text from the image, which may include a plurality of words. Additionally, identification of the text from the image may include the steps of identifying column and paragraph separation within the image based on difference in pixel intensity and for each paragraph in each column, identifying each word based on difference in pixel intensity of an area designated by space between two adjacent words.

Hence, for each text of the image, a rectangle may be identified. To find the rectangle, scan operation may start from the top left of the document. It may start with 4 pixels (a 2×2 rectangle). The average intensity of these 4 pixels may be computed. Thereafter, another column may be added. Further, the computed intensity may be compared with the previous value. When there may not be any difference, it may indicate that there may not be any text component.

The columns may be increased for a given row and the process may be repeated, such that, each time the value may be increasing by double the size. The same may be repeated for rows. When a change may found, the precise point of row or column may be found by decreasing the row and column and searching for text in both the parts. When the text (or mismatch in intensities) may be found in one of the halves, then it may further divided into two parts for comparison and the process may be repeated until start of text location may be located. In the same way, the end of text in a column and start of the text in other columns may be determined. The difference in maximum of the end coordinates and minimum of start coordinates may give the font size.

Additionally, the scanning may be continued until a space character may be encountered, as words (and sentences) may be separated by a space. The space may be detected by the absence of increase in the average intensity in the region due to the absence of any fragment of the text. The bottom row coordinates of last column provide the end of the word. It should be noted that the words may be sequentially extracted from each paragraph of each column in response to the identifying of each word. Further, a sentences may be created in response to sequential extraction of words from each paragraph of each column, using LSTM, for example.

Further at step 404, the translation device 200 may map the pattern to a word in a mapping table and at least one text attribute, based on a classifier network (for example, the class mapper 306). The at least one text attribute may include at least one of font, style, or color, and the style may be associated with a text being in bold, italics, strikethrough, or underline. In this step, the word image may be selected from a page of the document and further transformed in to machine readable text. The image patterns and associated descriptive text may be generated by the CNN (for example, the CNN 304). This has already explained in detail in conjunction with FIG. 2 and FIG. 3. Essentially, the translation device 200 may perform the class mapping for a given word image. In one embodiment, the output of the class mapper may be a hand-written image of the word being classified and the word images may be positioned next to each other with same font size.

Further at step 406, the translation device 200 may initiate an OCR conversion for the pattern, when at least one of the mapping between at least one of the pattern and at least one word in the mapping table and the mapping between the pattern and the at least one text attribute is below a predefined threshold.

Further, at step 408, the translation device 200 may perform incremental learning for the trained CNN and the classifier network based on the OCR conversion. This has already been explained in detail in conjunction with FIG. 2, FIGS. 3A and 3B. Further, the translation device 200 may render the sentences created using the LSTM to the user. The rendering of sentences may include the steps of receiving feedback from the user on the sentences rendered and performing the incremental learning based on the feedback. Further, the translation device 200 may generate a notification for the user and the notification may include at least one of warning of incorrect decoding and inability to support an attribute of the at least one attribute.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
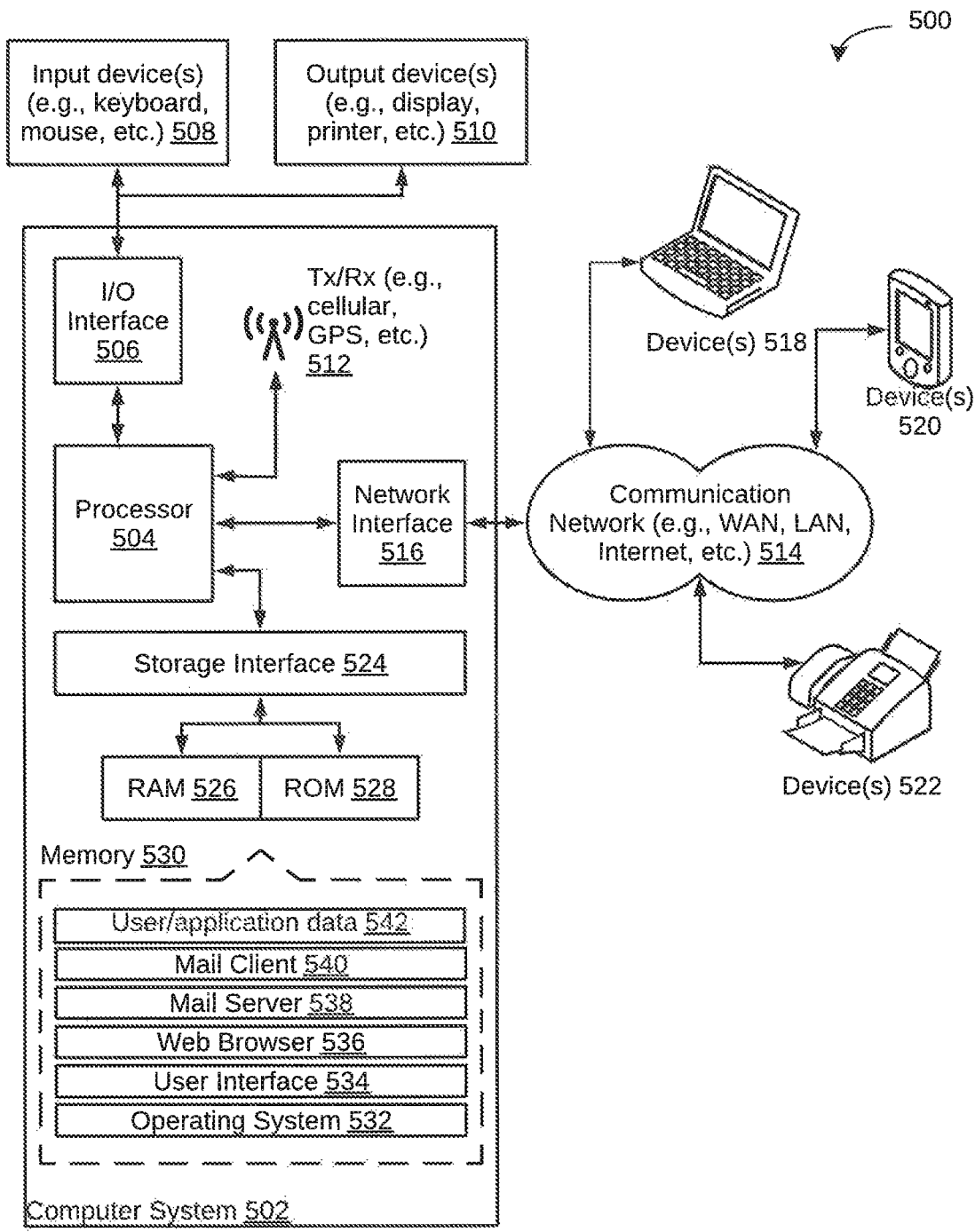
FIG. 5 is a block diagram of an exemplary computer system for implementing embodiments.

Referring now to FIG. 5, a block diagram of an exemplary computer system 502 for implementing various embodiments is illustrated. Computer system 502 may include a central processing unit ("CPU" or "processor") 504. Processor 504 may include at least one data processor for executing program components for executing user or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 514. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (for example, any data variables or data records discussed in this disclosure), etc. Operating system 532 may facilitate resource management and operation of computer system 502. Examples of operating systems 532 include, without limitation, APPLE® MACINTOSH® OS X platform, UNIX platform. Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for machine translation of text using deep learning. In particular, the method uses deep learning technique for machine translation of text, Further the method directly perform word level decoding instead of getting to character level and associated issues. In the method, long words spanning many characters are processed in one go. Hence, the method is faster than the character label methods. The method may also have self-assessment of module capability. Hence, when the system cannot understand the font or if numerals may be involved then it may let the user to know that the word-based translation cannot happen and the method may switch over to character based OCR technique and learns to transform it in the background for future use. Moreover, the method provides for transformation of a printed text in to a text image with user handwriting to maintain continuity in hand written documents. Additionally, through thus method it may be possible to transform hand written words and documents in on language to handwritten words and documents in other language.

The specification has described system and method of machine translation of text using deep learning. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of machine translation of text, the method comprising:
   processing, by a translation device, an image comprising a text to generate a pattern associated with the text based on a trained Convolution Neural Network (CNN), wherein the text is in a source language;
   mapping, by the translation device, the pattern to a word in a mapping table and at least one text attribute, based on a classifier network, wherein the word is in a target language;
   initiating, by the translation device, an Optical Character Recognition (OCR) conversion for the pattern, when at least one of the mapping between at least one of the pattern and at least one word in the mapping table and the mapping between the pattern and the at least one text attribute is below a predefined threshold; and
   performing, by the translation device, incremental learning for the trained CNN and the classifier network based on the OCR conversion.

2. The method of claim 1, wherein the at least one text attribute comprises at least one of font, style, or color, and wherein the style is associated with a text being in bold, italics, strikethrough, or underline.

3. The method of claim 1, further comprising identifying the text from the image, wherein the image comprises a plurality of words.

4. The method of claim 3, wherein the identifying comprises:
   identifying column and paragraph separation within the image based on difference in pixel intensity; and
   for each paragraph in each column, identifying each word based on difference in pixel intensity of an area designated by space between two adjacent words.

5. The method of claim 4 further comprising extracting words sequentially from each paragraph of each column in response to the identifying of each word.

6. The method of claim 5 further comprising creating sentences in response to sequential extraction of words from each paragraph of each column, using a Long Short Term Memory (LSTM).

7. The method of claim 6 further comprising rendering the sentences created using the LSTM to a user.

8. The method of claim 7 further comprising:
   receiving feedback from the user on the sentences rendered; and
   performing the incremental learning based on the feedback.

9. The method of claim 7 further comprising generating a notification for the user, wherein the notification comprises at least one of warning of incorrect decoding and inability to support an attribute of the at least one attribute.

10. A translation device for machine translation of text, the translation device comprising:
    a processor; and
    a memory communicatively coupled to the processor, wherein the memory stores processor instructions, which, on execution, causes the processor to:
       process an image comprising a text to generate a pattern associated with the text based on a trained Convolution Neural Network (CNN), wherein the text is in a source language;
       map the pattern to a word in a mapping table and at least one text attribute, based on a classifier network, wherein the word is in a target language;
       initiate an Optical Character Recognition (OCR) conversion for the pattern, when at least one of the mapping between at least one of the pattern and at least one word in the mapping table and the mapping between the pattern and the at least one text attribute is below a predefined threshold; and
       perform incremental learning for the trained CNN and the classifier network based on the OCR conversion.

11. The translation device of claim 10, wherein the at least one text attribute comprises at least one of font, style, or color, and wherein the style is associated with a text being in bold, italics, strikethrough, or underline.

12. The translation device of claim 11, wherein the processor instructions further cause the processor to identify the text from the image, wherein the image comprises a plurality of words.

13. The translation device of claim 12, wherein to identify the processor instructions further cause the processor to:
    identify column and paragraph separation within the image based on difference in pixel intensity; and
    for each paragraph in each column, identify each word based on difference in pixel intensity of an area designated by space between two adjacent words.

14. The translation device of claim 13, wherein the processor instructions further cause the processor to extract words sequentially from each paragraph of each column in response to the identifying of each word.

15. The translation device of claim 14, wherein the processor instructions further cause the processor to create sentences in response to sequential extraction of words from each paragraph of each column, using a Long Short Term Memory (LSTM).

16. The translation device of claim 15, wherein the processor instructions further cause the processor to render the sentences created using the LSTM to a user.

17. The translation device of claim 16, wherein the processor instructions further cause the processor to:
    receive feedback from the user on the sentences rendered; and
    perform the incremental learning based on the feedback.

18. The translation device of claim 17, wherein the processor instructions further cause the processor to generate a notification for the user, wherein the notification comprises at least one of warning of incorrect decoding and inability to support an attribute of the at least one attribute.

19. A non-transitory computer-readable storage medium having stored thereon, a set of computer-executable instructions causing a computer comprising one or more processors to perform steps comprising:
    processing, by a translation device, an image comprising a text to generate a pattern associated with the text based on a trained Convolution Neural Network (CNN), wherein the text is in a source language;
    mapping, by the translation device, the pattern to a word in a mapping table and at least one text attribute, based on a classifier network, wherein the word is in a target language;
    initiating, by the translation device, an Optical Character Recognition (OCR) conversion for the pattern, when at least one of the mapping between at least one of the pattern and at least one word in the mapping table and the mapping between the pattern and the at least one text attribute is below a predefined threshold; and
    performing, by the translation device, incremental learning for the trained CNN and the classifier network based on the OCR conversion.

\* \* \* \* \*